United States Patent [19]

Anderson et al.

[11] 4,249,355

[45] Feb. 10, 1981

[54] MODIFIED DOVETAIL JOINT

[75] Inventors: Earl R. Anderson, Bellevue; Lee E. Johnson, Mercer Island, both of Wash.

[73] Assignees: Douglas E. Chatfield; Frank Novak, both of Bellevue, Wash.

[21] Appl. No.: 786,761

[22] Filed: Apr. 12, 1977

[51] Int. Cl.³ .......................... E04C 1/10; E04C 3/30
[52] U.S. Cl. ..................................... 52/593; 52/642; 52/729; 403/381
[58] Field of Search .............. 52/593, 591, 729, 690, 52/730, 639, 642; 403/364, 381

[56] References Cited

U.S. PATENT DOCUMENTS

| 710,389 | 9/1902 | Wright | 52/753 B |
|---|---|---|---|
| 2,981,669 | 4/1961 | Brand et al. | 52/594 U X |
| 3,791,082 | 2/1974 | Bowling | 52/593 X |
| 3,960,637 | 6/1976 | Ostrow | 52/729 X |
| 3,991,535 | 11/1976 | Keller et al. | 52/642 |
| 4,191,000 | 3/1980 | Henderson | 52/729 |

Primary Examiner—Leslie Braun
Attorney, Agent, or Firm—Christensen, O'Connor, Johnson & Kindness

[57] ABSTRACT

A modified dovetail joint interconnects a plywood web to a chord. The chord carries two grooves extending inwardly from the surface of the chord intersected by the web. The two grooves merge into a single, wider groove adjacent the surface of the chord, are separated by a wedge-shaped spacer, and are inclined relative to each other. The plywood web carries two flexible tongues along its edge portion that are sized to engage respective ones of the grooves in the chord. The tongues are composed, at least in part, of two of the veneer layers of the plywood and are spaced from each other by a web groove formed in an intervening layer of veneer. The inner terminus of the web groove as well as the terminus of the glue laminate between the tongue forming layers of veneer and the adjacent intervening layer both lie below the surface of the chord when the web and the chord are assembled.

17 Claims, 7 Drawing Figures

MODIFIED DOVETAIL JOINT

BACKGROUND OF THE INVENTION

The present invention relates to a joint for interconnecting a web and a chord in a structural member and, more particularly, to an improved high strength, modified dovetail joint for joining a plywood web to a wooden chord.

Many joint constructions are known in the art for joining wooden webs to wooden chords. Of these several are modified dovetail type joints for interconnecting a plywood web to a solid wood chord. One specific joint construction is disclosed in U.S. Pat. No. 3,991,535, issued Nov. 16, 1976 to Keller et al. The Keller et al. joint is characterized as a pressed-in dovetail type joint. The Keller et al. joint includes two relatively inclined grooves in the chord that intersect each other at a location above the surface of the chord. Flexible tongues are formed on the edge portion of the plywood web and are constructed and sized to be received in respective ones of the grooves in the plywood chord. The Keller et al. construction requires that the lower terminus of the glue lamina or joint between each of the plurality of layers of veneer in the plywood web be located above the surface of the chord. Although a joint of the Keller et al. type is suitable for many structural purposes, it has been found that when a finished structural member employing a joint of the Keller et al. type is placed under loading, the adhesive bond between the layers of veneer forming the tongues and the adjacent intervening layer of veneer will tend to separate, weakening the joint. The separation of the adhesive bond, that is the failure of the adhesive laminae between the layers of veneer, is due at least in part to the interrelationship of the chord grooves and the bendable tongues on the web. For example, when a structural member employing a Keller et al. type joint is placed under a load, the glue laminae between the layers of veneer in the web are placed under a strain loading, which the ordinary glue laminae in plywood is not intended to withstand, causing the glue joint and resultant delamination or separation of the layers of veneer in the plywood web adjacent the chord. When this occurs, a substantial portion of the strength of the joint is lost and can, under certain circumstances, lead to complete failure of the joint between the web and the chord.

It is a broad object of the present invention to provide a modified dovetail joint that corrects the foregoing problem inherent in the type of modified dovetail joint just discussed and other joints of similar construction for joining a plywood web to a chord composed of solid wood or other material. It is another object of the present invention to provide a joint for interconnecting a plywood web and a chord that is self-locking once the web and chord are joined, thus eliminating the need for clamping the two while awaiting the cure of adhesive normally used to permanently bond the web to the chord. It is a further object of the present invention to provide an improved and modified dovetail joint that requires a minimum of adhesive for permanently affixing the web to the chord and still a further object of the present invention to provide a modified dovetail joint in which flexible tongues on a plywood web are inserted into respective inclined grooves in a chord that requires a minimum of material to be removed from the plywood web in order to construct the flexible tongues and at the same time produces joint structure having higher strength than those of the prior art.

SUMMARY OF THE INVENTION

In accordance with the foregoing objects and other objects that will become apparent to one of ordinary skill in the art after reading the following specification, the present invention is directed to a modified dovetail joint for interconnecting a plywood web to a chord in mutually intersecting relationship. The chord has a surface and at least first and second grooves that extend inwardly into the chord relative to that surface and that merge into a single groove adjacent the chord surface. The first and second grooves are separated by a spacer member integral with the chord at a location spaced inwardly from the single groove. The upper portion of the spacer member terminates at a location inwardly from the surface of the chord. The plywood web comprises at least first and second layers of veneer having their grain oriented transversely to the surface of the chord and at least one intervening layer of veneer. The edge portion of the web has at least first and second tongues that are separated by a web groove extending into the edge portion of the web from its edge. At least a portion of the first and second tongues are composed respectively of at least portions of the first and second layers of veneer. The first and second tongues extend into mating engagement with respective ones of the first and second grooves in the chord while the web groove receives the spacer member between the first and second tongues.

By so constructing the tongues on the web and the grooves in the chord, the inner termini of the web groove as well as the terminus of the adhesive laminae between the layers of veneer forming the web tongues and an intervening layer of veneer can be positioned below the surface of the chord. In this manner, when the web and chord structure is placed under a load in a direction transverse to the surface of the chord, the termini of the adhesive laminae in the web are not placed under a strain, but instead are maintained in a relatively strain-free relationship by the portion of the chord structure itself being adjacent the chord grooves.

BRIEF DESCRIPTION OF THE DRAWINGS

A better understanding of the present invention can be derived by reading the ensuing specification in conjunction with the accompanying drawings wherein.

DETAILED DESCRIPTION OF THE INVENTION

Figure 1:
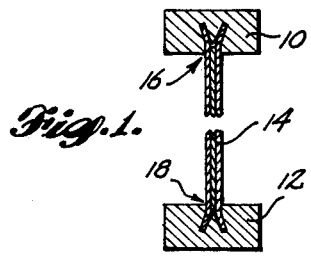
FIG. 1 is a cross-sectional view of an I beam constructed from two spaced, solid wood chords and a plywood web that are joined to each other by a joint constructed in accordance with the present invention.

The present invention is normally used in the enviornment of a structural member such as a truss or an I beam wherein two chord members are joined together by a web, or in other structural configurations wherein a chord/web configuration can be substituted for a conventional structural member. For example, an I beam constructed in accordance with the present invention can be substituted for a conventional floor or roof joist normally made from a solid wooden beam of rectangular cross-section. Referring to FIG. 1, a cross-section of an I beam constructed in accordance with the present invention includes an upper chord 10, a lower chord 12 and a web 14 interconnecting the upper and lower chords 10 and 12 to form a rigid structural unit. The upper edge portion of the web 14 is joined to the upper chord 10 by a modified dovetail joint 16 manufactured and joined in accordance with the present invention, while the lower chord 12 is joined to the bottom edge portion of the web 14 by a similar modified dovetail joint 18.

Figure 2:
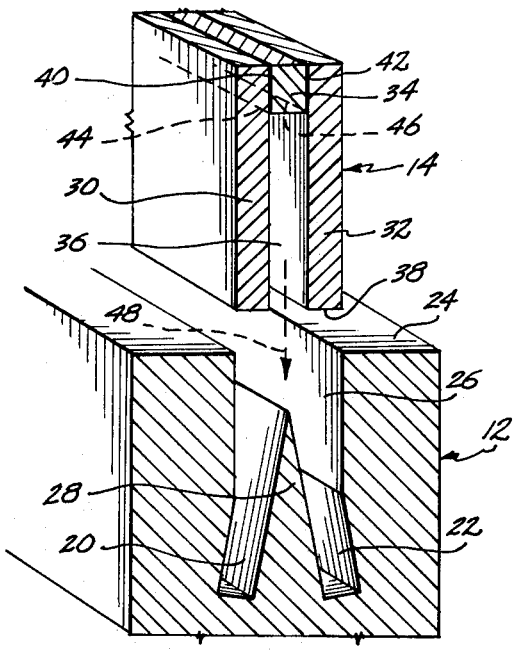
FIGS. 2 and 3 are enlarged isometric views in partial cross-section of a first embodiment of the present invention, FIG. 2 showing a web and a chord prior to joinder and FIG. 3 illustrating a completed joint.

Referring to FIG. 2, a segment of the lower chord 12 and the lower edge portion of the web 14 form the interconnecting portion of the web and chord and, when joined, together form the modified dovetail joint of the present invention. The chord 12 carries a pair of grooves 20 and 22 that extend inwardly from the upper surface 24 of the chord 12. The grooves 20 and 22 are preferably relatively inclined and, in this embodiment, diverge as they extend inwardly relative to the surface 24 of the chord. Adjacent the surface of the chord the two grooves 20 and 22 merge into a single wider groove 26 that emerges through the surface 24 of the chord 12. The single merged groove 26 intersects the chord surface 24 preferably at a right angle so that when the web 14 is joined to the chord, the web will be oriented substantially at a right angle to the surface 24 of the chord. The relatively inclined grooves 20 and 22 are separated by a spacer 28 that is integral with the chord 12. The spacer 28 is preferably wedge-shaped, having a base, or lower portion, lying adjacent the bottom or innermost portions of the inclined grooves 20 and 22 and having an apex, or upper portion, that is spaced inwardly from the surface 24 of the chord 12.

The groove structure including the inclined grooves 20 and 22, the merged groove 26 and the spacer 28 can run along the entire longitudinal dimension of the chord so that a web 14 corresponding in length to the chord may be joined with the chord along the entire length of the chord. Alternatively, the groove structure in the chord can be formed in segments spaced from each other along the longitudinal dimension of the chord to receive web segments, thereby forming a beam having a plurality of web segments or sections spaced along the length of the beam. The groove is conventionally formed by running the chord longitudinally through a first pair of spaced and relatively inclined saw blades to form the two inwardly extending grooves 20 and 22 and thereafter forming the vertical sides of the merged groove 26 either with a second set of spaced, parallel saw blades that are ganged in sequence with the first set of saw blades or by again running the chord longitudinally past a second set of saw blades in a separate operation. The width of the merged groove 26 is substantially equal to or slightly less than the width of the plywood web 14. When the width of the merged groove 26 is slightly less than the width of the web, an interference fit will occur when the web 14 is inserted into the groove structure, thereby temporarily restraining the web 14 in the groove structure of the chord 12.

The web 14, in this embodiment, comprises a first exterior layer 30 of veneer separated from a second exterior layer 32 of veneer by an intervening layer 34 of veneer. A web groove 36 extends inwardly into the web 14 from the bottom edge 38 of the web. The depth of the web groove 36 corresponds substantially to the height of the wedge-shaped spacer 28, although the depth can be slightly greater than the height of the wedge. In this embodiment, the innermost portion of the groove is defined by an edge of the intervening layer 34 of veneer. The adhesive laminae 40 and 42 joining the intervening layer to respective ones of the first and second exterior layers 30 and 32 of veneer each have a bottom terminus (represented by dotted lines) 44 and 46 that in this embodiment is located adjacent the innermost portion of the web groove 36. The web groove 36 spaces the edge portions of the exterior layers 30 and 32 of veneer to form two spaced, flexible tongues extending along the edge portion of the web 14. For ultimate joint strength, it is desirable and in fact necessary for the grain of the exterior layers 30 and 32 of veneer to be oriented in a transverse direction relative to the surface 24 of the chord when the web is inserted in the chord. It is not necessary that the grain of the exterior layers 30 and 32 be perpendicular to the surface 24 of the chord; however, a perpendicular orientation of the grain relative to the chord surface is preferable to provide maximum joint strength.

Figure 3:
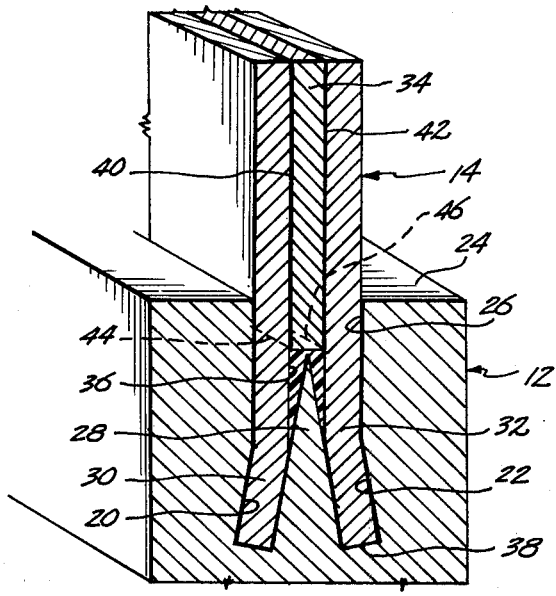

After the groove structure is formed in the chord and the web groove 36 is formed in the web, the web is inserted in the direction of arrow 48 into the grooove structure. Referring to FIG. 3, as the flexible tongues formed by the edge portion of the exterior layers of veneer 30 and 32 are inserted into the groove structure, they are received by the inclined grooves 20 and 22 and are caused to flex outwardly relative to each other as they are seated in the innermost portions of the spaced grooves 20 and 22. The chord grooves 20 and 22 have a width substantially equal to the thickness of the flexible tongues, so that when the tongues are received by the grooves and are flexed outwardly, the tongues and thus the web 14 will be temporarily secured to the chord. Prior to inserting the edge portion of the web 14 into the chord 12, the exterior and interior surfaces of the flexible tongues are coated with a suitable construction adhesive. In this embodiment excess adhesive is placed in the innermost portion of the web groove 36 so that when the edge portion of the web is inserted in the chord groove structure the excess adhesive will fill the void space defined between the upper portion of the wedge-shaped spacer 28 and the inner portion of the walls defining the web groove 36. Since the web and chord are temporarily secured to each other by the nature of the joint itself, the adhesive can thereafter cure to permanently join the web and the chord without the use of clamps or fasteners.

Since the apex of the spacer 28 is located below the surface 24 of the chord and since the depth of the web groove corresponds substantially to the height of the spacer 28, the longitudinally extending termini 44 and 46 of the adhesive laminae between the layers 30, 32 and 34 of veneer are also situated below the surface of 24 in the completed joint. Thus, because of the construction of the joint, and especially the spacer 28 and the web groove 36, the adhesive laminae termini between the layers of veneer of the web are not subjected to a strain when the finished structural member is placed under a loading. Instead, the solid chord structure 12 adjacent the surface 24 of the chord tends to support the exterior layers of veneer, and thus the adhesive laminae adjacent their termini and relieve the laminae from strain, thereby preventing delamination of the layers of veneer of the web 14 adjacent the adhesive laminae termini when the finished structure is placed under a load.

Figure 4:
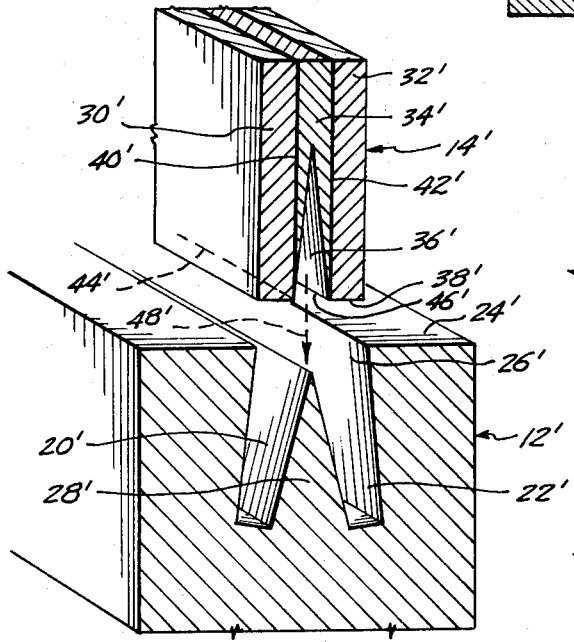
FIGS. 4 and 5 are enlarged isometric views in partial cross-section of another embodiment of the modified dovetail joint of the present invention, FIG. 4 showing the web and chord prior to joinder and FIG. 5 illustrating a completed joint.
Figure 5:
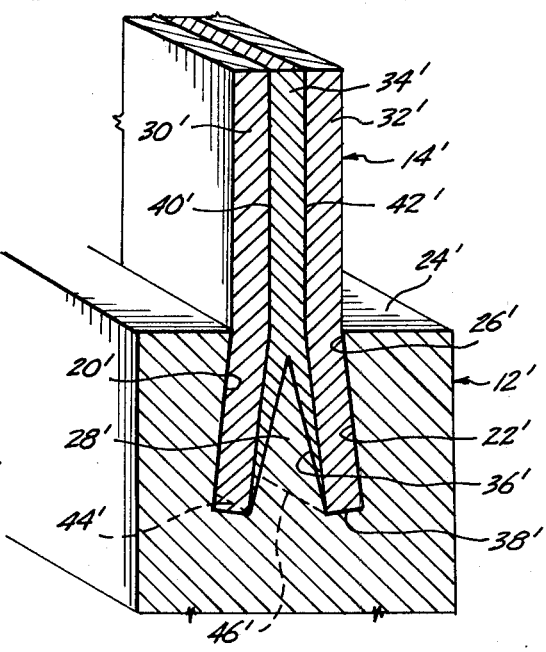

A preferred joint constructed in accordance with the present invention that has an even higher strength than the embodiment just described is illustrated in FIGS. 4 and 5. In the preferred embodiment, the broad concepts of constructing the modified dovetail joint so that the termini of the adhesive laminae adjacent the layers of veneer in the web forming the flexible tongues are located below the surface of the chord are the same. However in this embodiment, the construction of the joint is made much simpler by the use of special tools, and results in an even stronger joint than that previously described. In this embodiment the chord 12' is provided with a pair of relatively inclined spaced grooves 20' and 22' separated by a wedge-shaped spacer 28'. Again, the apex of the spacer 28' is located below the surface 24' of the chord. The spaced grooves 20' and 22' merge into a single groove 26' adjacent the surface 24' of the chord. The grooves 20' and 22' as well as the merged groove 26' can be simultaneously formed by two ganged saw blades in a single longitudinal run of the chord past the blades. The saw blades have teeth that are trapezoidally shaped, that is, they are in the form of a truncated wedge. The two blades are angled outwardly relative to each other so that the inclined grooves 20' and 22' diverge as they extend inwardly into the chord 12'.

The flexible tongues are formed along the edge portion of the web 14' by a single longitudinal cut with a saw blade having wedge-shaped teeth to form a web groove 36' of triangular cross-section. The apex of the web groove 36' is located at a distance inwardly from the bottom edge 38' of the web 14' that is substantially equal to the height of the spacer 28' in the chord. In this embodiment, the entire web groove 36' is formed in the intervening layer 34' of veneer of the web with the base of the triangular web groove 36' located adjacent the bottom edge of the web. In this embodiment the flexible tongues are formed by the exterior layers 30' and 32' of veneer of the web 14' and by a portion of the intervening layer 34' of veneer remaining on each side of the web groove 36'. The base of the web groove 36' has a width that corresponds substantially to the intervening layer 34' of the veneer, thus locating the termini 44' and 46' of the adhesive laminae adjacent the exterior layers 30' and 32' of veneer adjacent or coincident with the bottom edge 38' of the web 14'.

As in the previous embodiment, after the groove structure is formed in the chord and the web groove 36' is formed in the web, the edge portion of the web is coated with a suitable construction adhesive and inserted in the direction of arrow 48' into the groove structure in the chord 12', resulting in a joint construction as illustrated in FIG. 5. The web groove 36' and the spaced chord grooves 20' and 22' are so sized that when the edge portion of the web is inserted into the chord grooves, substantially no void space remains between the surfaces defining the web groove 36' and the spacer 28' or between the outer surfaces of the chord grooves 20' and 22' and the corresponding and mating exterior surfaces of the flexible tongues. Thus in this embodiment the termini 44' and 46' of the adhesive laminae adjacent the layers of veneer forming the flexible tongues are situated adjacent the innermost portion of the chord grooves 20' and 22' in the finished joint. In this manner the portion of the adhesive laminae adjacent their respective termini 44' and 46' are even further removed from any potential strain to which they might otherwise be subjected in modified dovetail joints of the prior art.

Figures 6, 7:
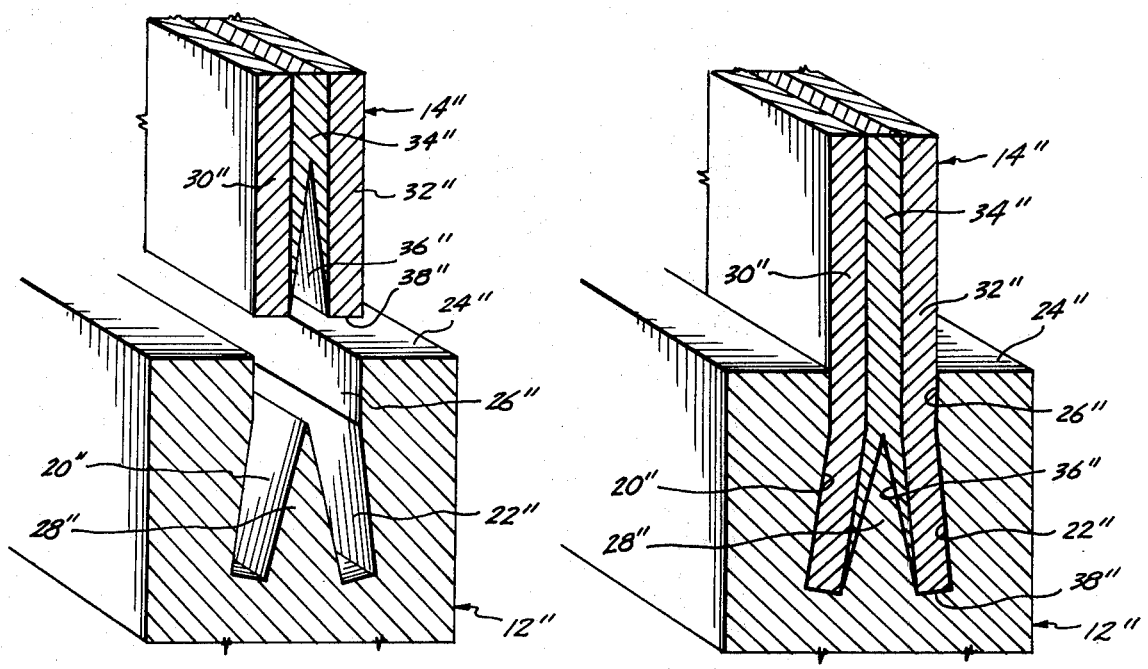
FIGS. 6 and 7 are enlarged isometric views in partial cross-section of a presently preferred embodiment of the modified dovetail joint of the present invention, FIG. 6 showing the web and chord prior to joinder and FIG. 7 illustrating a completed joint.

Presently, the most preferred joint constructed in accordance with the present invention is illustrated in FIGS. 6 and 7. This embodiment is a combination of features of both of the embodiments just described. In this preferred embodiment, a specialized groove construction is employed in the chord to reduce any tendency of the center veneer to split upwardly in a direction parallel to the glue laminae from the inner portion of the web groove after the web tongues are inserted into the first and second grooves in the chord. In this embodiment the chord 12" is provided with a pair of relatively inclined, spaced grooves 20" and 22" separated by a wedge-shaped spacer 28". The apex of the spacer 28" is located below the surface 24" of the chord. The spaced grooves 20" and 22" merge into a single groove 26" adjacent the surface 24" of the chord. The grooves 20" and 22" diverge as they extend inwardly relative to the surface of the chord. Moreover, the spaced grooves 20" and 22" each have side walls that are convergent as they extend inwardly relative to the surface of the chord. The apex or upper portion of the spacer 28" lies in a plane that is substantially parallel to the upper surface 24" of the chord. The side walls of the single groove 26" are parallel to each other and merge into the outermost mutually opposing side walls of the respective single grooves, i.e., the sidewalls of the single grooves that are opposite the spacer member, at a location lying substantially in the aforementioned plane. Preferably, the sides of the single grooves are perpendicular to the surface of the chord so that when the web is inserted into the grooves, the web is necessarily oriented perpendicularly to the chord surface. The single groove, as in the previous embodiments, has a width substantially equal to or slightly less than the width of the web. Consequently the width of the aforementioned plane at the location where the single groove side walls merge into the mutually opposing side walls of the spaced grooves, the single groove still has a width equal to or slightly larger than the web, i.e., a width substantially equal to the width of the web. When the web 14" is in position in the grooves in the chord 12", the web is laterally supported at the junction of the single groove and the spaced grooves, preventing it from spreading or splitting upwardly at the innermost portion of the web groove adjacent the apex of the spacer. Even if the intervening layer 34" of veneer tended to split upwardly above the innermost portion of the web groove, the interfering fit relationship between the web tongues and the spaced and single groove would force the adhesive used to bond the web to the chord into such a split or crack. Thus when the adhesive bond between the web and the chord is cured, a joint having no void spaced between the web and chord structure is formed.

Referring to the embodiments illustrated in FIGS. 4 through 7, it is most preferred that the spaced grooves and single groove be constructed and oriented relative to the web and web tongue so as to provide an interfering fit when the web and chord are joined. Within the broad concepts of the invention, the termini of the adhesive laminae between the layers of veneer of the web can be situated anywhere below the surface of the chord. However, it is most preferred that the web groove be formed so that the termini of the adhesive laminae lie below the upper portion of the spacer member. In addition, to provide a more flexible tongue, the base or widest portion of the web groove can extend into the outer layers of veneer so that the bottom portions of the tongues have a width less than the thickness of a layer of veneer. Thus when the tongues are inserted into corresponding grooves in a chord, they will more easily bend while still spreading outwardly to secure the web in the chord before the adhesive bond is cured. Of course, if the base of the web groove extends into the outer layer of veneer, the termini of the adhesive laminae between the outer layer of veneer and the next adjacent layer will be spaced inwardly from the edge of the web. In the latter instance, it is still preferred that the termini be located below the upper portion or apex of the spacer member.

The present invention has been described in relation to a preferred embodiment and an alternate thereof. After reading the foregoing specification, one of ordinary skill in the art will be able to effect various alterations to the described structures, will be able to substitute equivalent structures and make various other changes without departing from the overall concepts disclosed and described herein. It is therefore intended that the protection afforded the present invention by Letters Patent be limited only by the definition contained in the appended claims and equivalents thereof.

What is claimed is:

1. A modified dovetail joint for interconnecting a plywood web to a chord in mutually intersecting relationship, said plywood web comprising at least first and second layers of veneer and at least one intervening layer of veneer, said web having an edge portion, said chord having a surface and at least first and second grooves extending inwardly into said chord, said first and second grooves being separated by a spacer member integral with said chord, the edge portion of said web having at least first and second tongues extending into mating engagement with respective ones of said first and second grooves, said first and second tongues being separated by a web groove extending into the edge portion of said web from the edge of said web, said web groove receiving said spacer member between said first and second tongues, said first and second grooves being so constructed and oriented relative to each other as to cause at least one of said tongues to flex relative to the other when said tongues are inserted into said first and second grooves, at least a portion of said first and second tongues being composed respectively of at least a portion of said first and second layers of veneer, the grain of said first and second layers of veneer being oriented transversely to the surface of said chord, said first and second layers of veneer being respectively adhesively bonded to an intervening layer of veneer to form an adhesive lamina between each of said first and second layers of veneer and an intervening layer of veneer, the terminus of each said adhesive lamina lying in the edge portion of said web and being located inwardly from the surface of said chord.

2. The joint of claim 1 wherein said first and second grooves merge into a single groove adjacent the surface of said chord, wherein the upper portion of said spacer member terminates at a location spaced inwardly from the upper surface of said chord, and wherein the inner portion of said web groove is located inwardly from the surface of said chord.

3. The joint of claim 2 wherein the sides of said single groove are substantially parallel to each other.

4. The joint of claim 3 wherein said first and second grooves are inclined relative to each other, and wherein the sides of said first and second grooves that are opposite the spacer member merge into respective ones of the side walls of said single groove along a plane oriented substantially parallel to the surface of said chord, the upper portion of said spacer member being positioned substantially in said plane.

5. The joint of claim 4 wherein the width of said single groove is substantially equal to the width of said plywood web.

6. The joint of claim 5 wherein said first and second grooves convergently taper as said grooves extend inwardly from the surface of said chord.

7. The joint of claim 6 wherein the terminus of each said adhesive lamina is spaced inwardly from the upper portion of said spacer member.

8. The joint of claim 7 wherein said web is adhesively bonded to said chord.

9. The joint of claim 2 wherein said first and second grooves are inclinded relative to each other so as to cause at least one of said tongues to flex relative to the other tongue when said tongues are inserted in said grooves.

10. The joint of claim 9 wherein said web is adhesively bonded to said chord.

11. The joint of claim 9 wherein said spacer member is a wedge having a base and an apex, the base of said wedge being located adjacent to inner portions of said first and second grooves, the apex of said wedge being located adjacent said single groove and inwardly from the surface of said chord.

12. The joint of claim 11 wherein the width of said single groove is substantially equal to the width of said plywood web.

13. The joint of claim 11 wherein the width of said single groove is slightly less than the width of said plywood web to thereby create an interference fit between said web and the surfaces of said chord defining said single groove.

14. The joint of claim 9 wherein the terminus of each said adhesive lamina adjacent said first and second layers of veneer are located adjacent the innermost portion of respective ones of said first and second grooves.

15. The joint of claim 14 wherein said first tongue comprises an edge portion of said first layer of veneer and at least a portion of any intervening layer of veneer, and wherein said second tongue comprises an edge portion of said second layer of veneer and at least a portion of an intervening layer of veneer.

16. The joint of claim 15 wherein said plywood web consists of three layers of veneer, said web groove being wedge-shaped and being located substantially in said intervening layer of veneer.

17. The joint of claim 15 wherein said web groove and said spacer member are wedge-shaped.

* * * * *